(12) United States Patent
Tsai et al.

(10) Patent No.: US 8,290,981 B2
(45) Date of Patent: Oct. 16, 2012

(54) SOCIAL NETWORK SYSTEM AND MEMBER SEARCHING AND ANALYZING METHOD IN SOCIAL NETWORK

(75) Inventors: Pei-Yun Tsai, Tu-Cheng (TW); Mike Wen-Hsing Chiang, Santa Clara, CA (US); Ling-Wei Liu, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/043,309

(22) Filed: Mar. 8, 2011

(65) Prior Publication Data
US 2012/0233197 A1    Sep. 13, 2012

(51) Int. Cl.
*G06F 7/00* (2006.01)
*G06F 17/30* (2006.01)

(52) U.S. Cl. ........ 707/784; 707/811; 715/789; 715/811; 705/14.66; 705/319

(58) Field of Classification Search ............ 707/784, 707/E17.059, E17.06, 706, 726, 732, 733, 707/734, 794, 709; 715/789, 811; 705/14.06, 705/319, 14.66
See application file for complete search history.

(56) References Cited

U.S. PATENT DOCUMENTS

| | | | | |
|---|---|---|---|---|
| 7,069,308 | B2 * | 6/2006 | Abrams | 709/218 |
| 7,512,612 | B1 * | 3/2009 | Akella et al. | 707/999.003 |
| 7,831,582 | B1 * | 11/2010 | Scofield et al. | 707/706 |
| 2005/0283753 | A1 * | 12/2005 | Ho et al. | 707/3 |
| 2006/0042483 | A1 * | 3/2006 | Work et al. | 101/91 |
| 2007/0260599 | A1 * | 11/2007 | McGuire et al. | 707/5 |
| 2007/0271272 | A1 * | 11/2007 | McGuire et al. | 707/9 |
| 2008/0120411 | A1 * | 5/2008 | Eberle | 709/225 |
| 2008/0270158 | A1 * | 10/2008 | Abhyanker | 705/1 |
| 2009/0027392 | A1 * | 1/2009 | Jadhav et al. | 345/440 |
| 2009/0228296 | A1 * | 9/2009 | Ismalon | 705/1 |
| 2009/0282104 | A1 * | 11/2009 | O'Sullivan et al. | 709/204 |
| 2010/0100412 | A1 * | 4/2010 | Cases et al. | 705/9 |
| 2011/0295903 | A1 * | 12/2011 | Chen | 707/794 |
| 2012/0066072 | A1 * | 3/2012 | Kanigsberg et al. | 705/14.66 |
| 2012/0095078 | A1 * | 4/2012 | Ronai | 435/6.14 |
| 2012/0095977 | A1 * | 4/2012 | Levin et al. | 707/706 |

OTHER PUBLICATIONS

Christopher P. Diehl, Galileo Namata and Lise Getoor—"Relationship Identification for Social Network Discovery"—Proceedings of the National . . . , 2007—Association for the Advancement of Artificial Intelligence (www.aaai.org).aaai.org—(pp. 546-552).*

Carmel et al.—"Personalized social search based on the users social network"—Proceeding CIKM '09—Proceedings of the 18th ACM conference on Information and knowledge management—Nov. 2-6, 2009, Hong Kong, China, (pp. 1227-1236).*

* cited by examiner

*Primary Examiner* — Anh Ly
(74) *Attorney, Agent, or Firm* — Altis Law Group, Inc.

(57) ABSTRACT

A social network searching system includes a user profile storage, a profile search engine and a linkage construction engine. The user profile storage stores user profiles. The profile search engine obtains a target member by searching the user profile storage based on a profile query from a query user. The linkage construction engine constructs a relationship linkage and extracting an optimal path from at least two paths from the query user to the target member according to a relationship linkage. A member searching and analyzing method of social network is also disclosed.

18 Claims, 4 Drawing Sheets

SOCIAL NETWORK SYSTEM AND MEMBER SEARCHING AND ANALYZING METHOD IN SOCIAL NETWORK

BACKGROUND

The disclosure generally relates to a social network system with relationship linkage and a member searching and analyzing method.

DESCRIPTION OF RELATED ART

In its short history, portals and search engines, such as GOOGLE®, have mainly driven Internet usage. Recently, the rapid growth of social network sites, such as MYSPACE® and FACEBOOK®, has revealed a new trend of Internet usage. Social network generally relates to services and tools that help users maintain and expand their personal network usually by exploiting existing or connecting relationships. Social network sites have shown potential to become the place on the Internet where many people spend most of their time, thus making these sites the main entry point for online activity.

In general, the user can create an individual profile and establish a network of various members. Each profile can include visual materials such as photographs of the user and things relevant to the user. In this way, one user can search a target member via the social network. However, only relevant members are listed in the inquired result based on the target profile.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming languages such as Java, C, or Assembly. One or more software instructions in the modules may be embedded in firmware, such as an EPROM. It is noteworthy, that modules may comprise connected logic units, such as gates and flip-flops, and programmable units such as programmable gate arrays or processors. The modules described herein may be implemented as software and/or hardware modules and may be stored in any type of computer-readable medium or other computer storage device.

Figure 1:
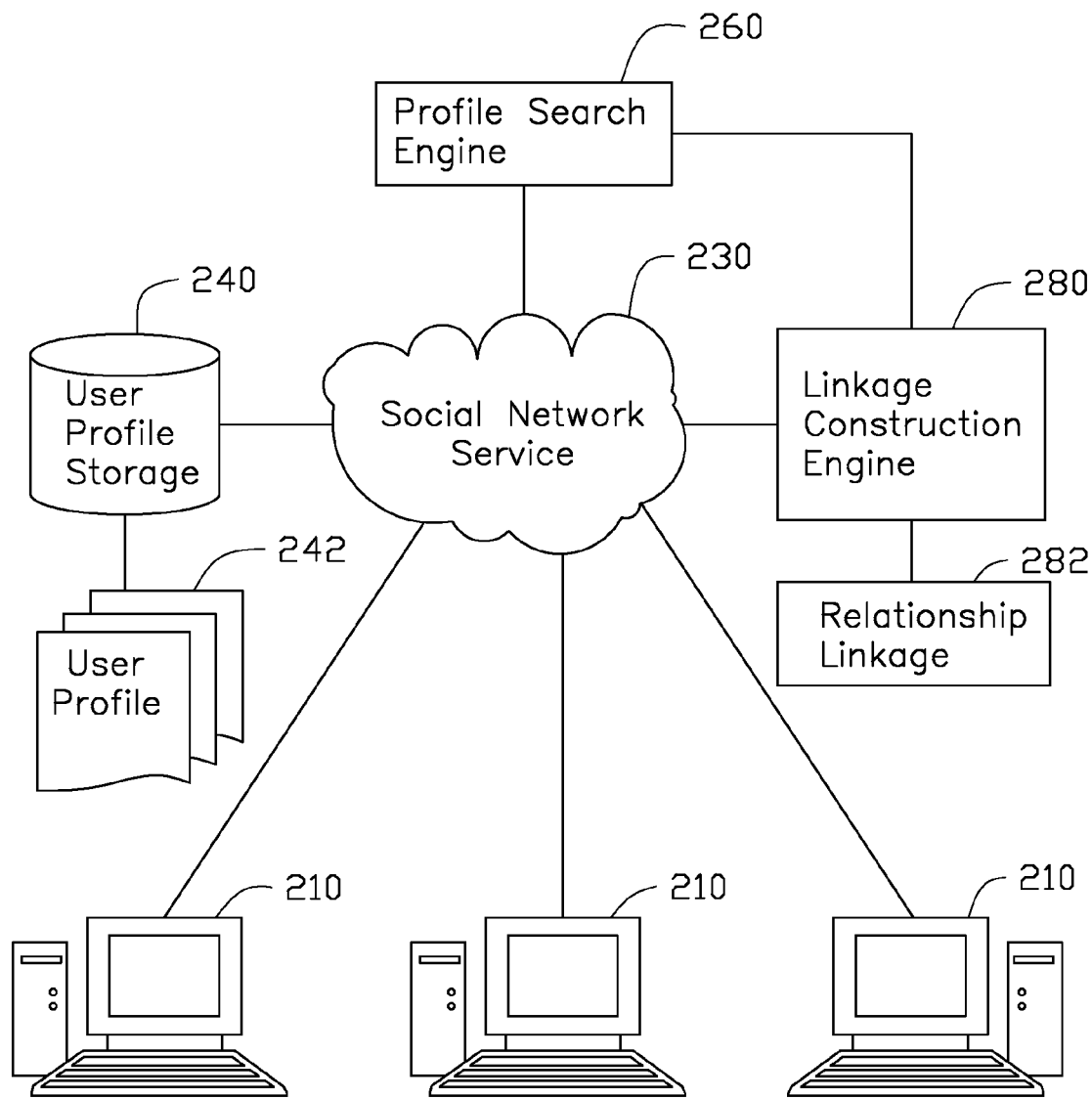
FIG. 1 is a schematic illustration of social network configured for member searching and analyzing.

Referring to FIG. 1, in one embodiment, a social network system includes a user profile storage 240, a profile search engine 260 and a linkage construction engine 280. The user profile storage 240, the profile search engine 260 and the linkage construction engine 280 are interconnected via a social network service 230. A plurality of users 210 may connect to the social network service 230 through a computer communications network. The social network service 230 can be provided by a computing platform.

The user profile storage 240 stores a plurality of user profiles 242. The profile search engine 260 can search the user profile storage 240 by inputting a profile query from the user 210. A member list result may be obtained based on the input profile query. The member list may include at least one target member.

The linkage construction engine 280 can construct a relationship linkage, including the query user and the target member. Many paths may be detected to connect to each target member from the query user. The linkage construction engine 280 can extract an optimal path to each target member according to the relationship linkage.

The linkage construction engine 280 can directly record interaction between members in the relationship linkage. The members may include the target member, the query user, and a plurality of node members between the target member and the query user. The interaction may include any activity events between two members, such as e-mail, instant messaging, member blog entries, comment posting in the members blog, interaction games, or the number of common members.

A relationship score is calculated between two members based on a degree of the interaction when constructing the relationship linkage. That is, each relationship score is associated with the degree of interaction between every two of the query user, the target member, and the node members. The degree of the interaction may include time interval from the latest interaction to present, frequency of the interaction and strength value of each interaction. The strength value of each interaction of the interaction may include duration of the interaction. The degree of the interaction is in inverse proportion with time interval from the latest interaction to present, and in direct proportion with frequency of the interaction and the strength value of the interaction.

The linkage construction engine 280 can calculate at least two path values from query user to each target member, according to the relationship scores between the members in relationship linkage. An optimal path can be selected according to the at least two path values. The optimal path may be recommended to the query user.

Figure 2:
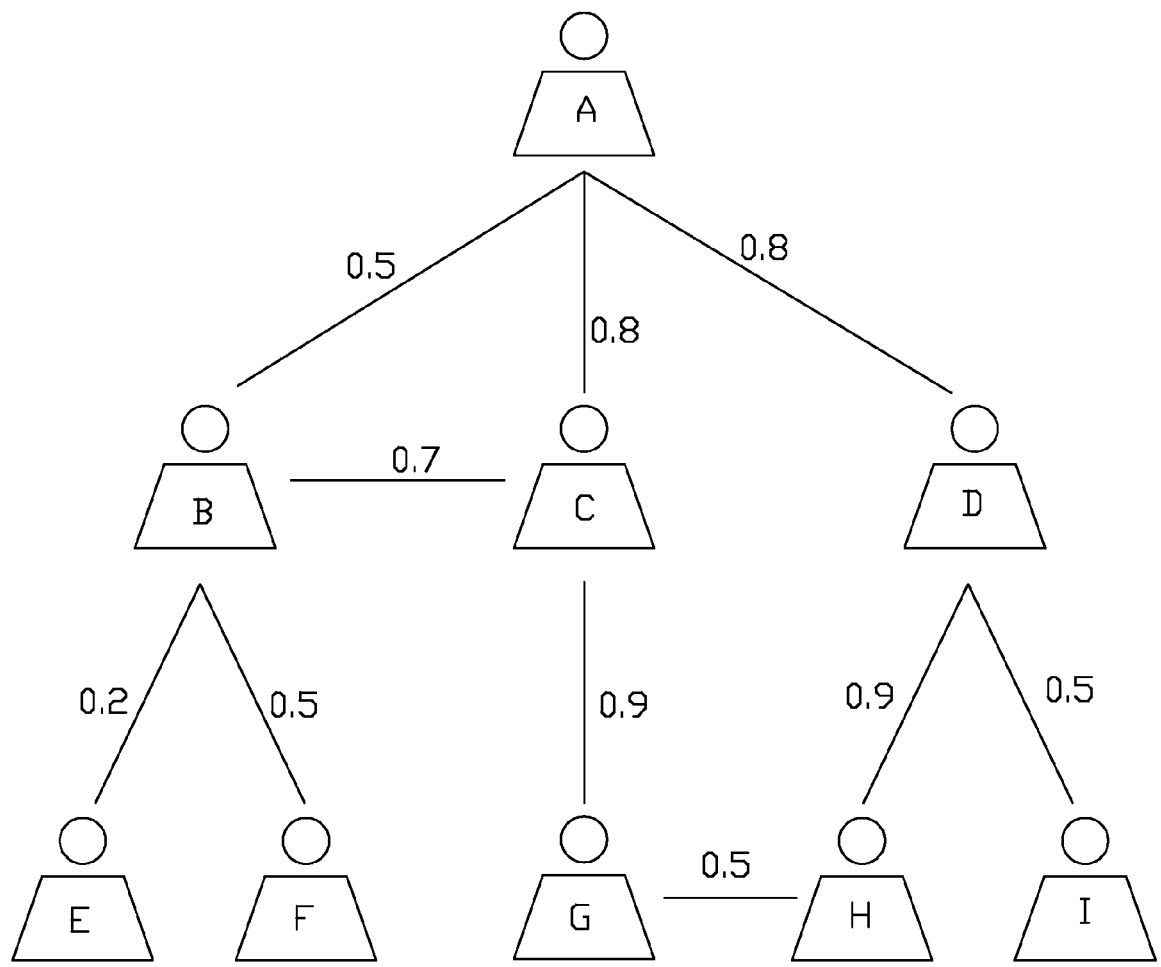
FIG. 2 is a graph of relationship linkage with relationship scores according to one embodiment.

Referring to FIG. 2, in one embodiment, a relationship linkage is constructed by the linkage construction engine 280. The number between two members is the relationship score calculated by the linkage construction engine 280. Each relationship score is defined in range from 0 to 1. A higher relationship score indicates a better relationship. If a query user A searches target member E, at least three paths from query user A to target member E, such as A-B-E, A-C-B-E, and A-D-H-G-C-B-E are detected. Each path value is calculated by multiplying all passed relationship scores in each path from the query user A to the target member E. The path value of A-B-E is 0.5*0.2 equals to 0.1. The path value of A-C-B-E is 0.8*0.7*0.2 equals to 0.112. The path value of A-D-H-G-C-B-E is 0.8*0.9*0.5*0.9*0.7*0.2 equals to 0.14536. Therefore, the path of A-C-B-E is the optimal path indicating a better relationship. Member C is recommended to the query user A to find the target member E.

Figure 3:
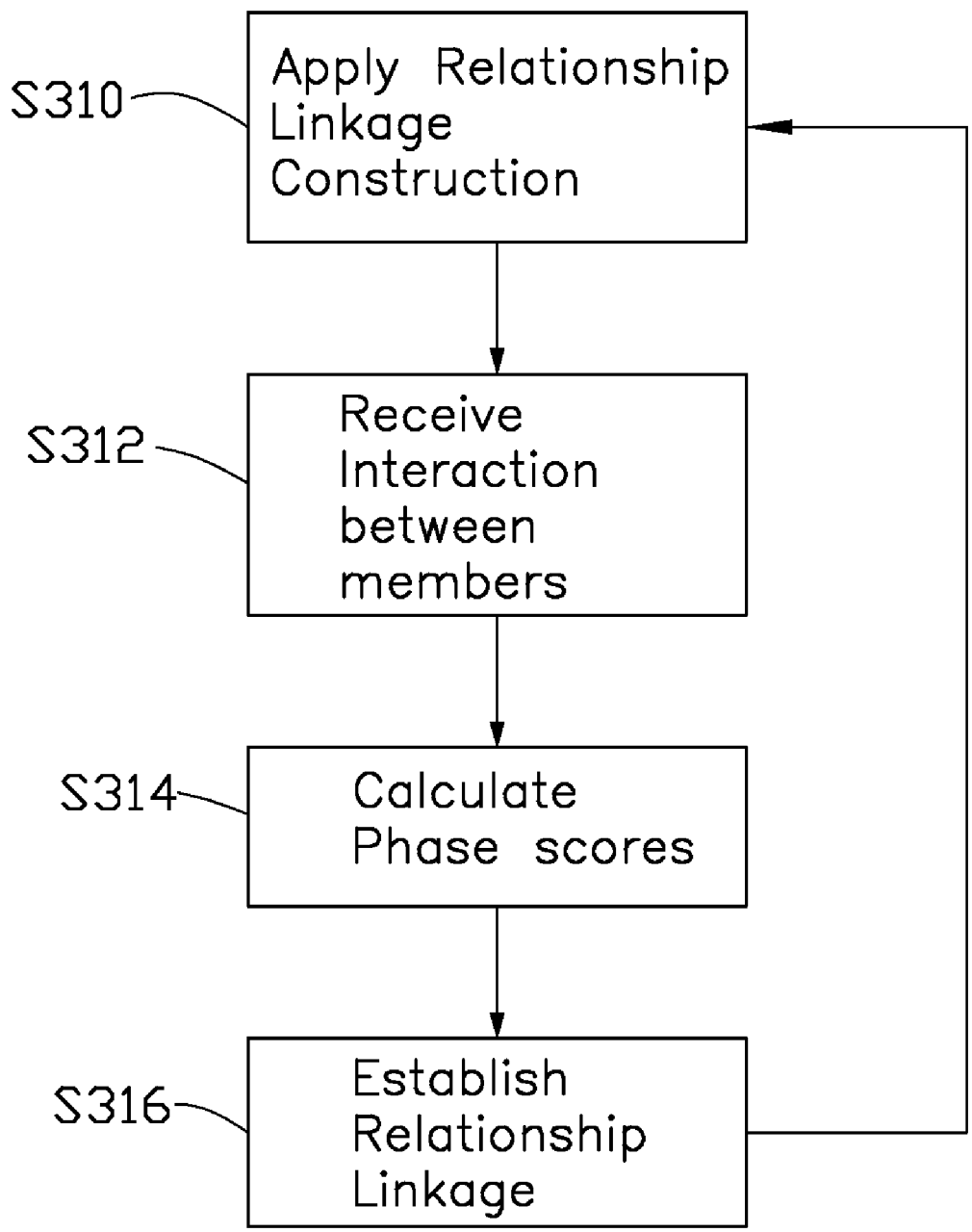
FIG. 3 is a flow chart illustrating a process for constructing a relationship linkage in one embodiment.

Referring to FIG. 3, in one embodiment, a method for constructing a relationship linkage includes the following steps:

In block S310, the linkage construction engine 280 may receive an application for a relationship linkage construction from the search engine 260 or directly from the user 210.

In block S312, the linkage construction engine 280 obtains a plurality of node members, and the linkage construction engine 280 may directly record the interaction between members or receive interaction between members from the user profile storage 240.

In block S314, a plurality of relationship scores between the members based on degrees of the interaction are calculated by the linkage construction engine 280. The plurality of relationship scores indicates relationship phase between every two of the query user, the target member and the node members.

In block S316, the relationship linkage is established by associating the members and the plurality of relationship scores. The relationship linkage may be displayed in form of relationship linkage graph. The relationship linkage graph can directly illustrate members and the relationship scores in the member linkage. The relationship linkage can be updated by receiving the next application.

Figure 4:
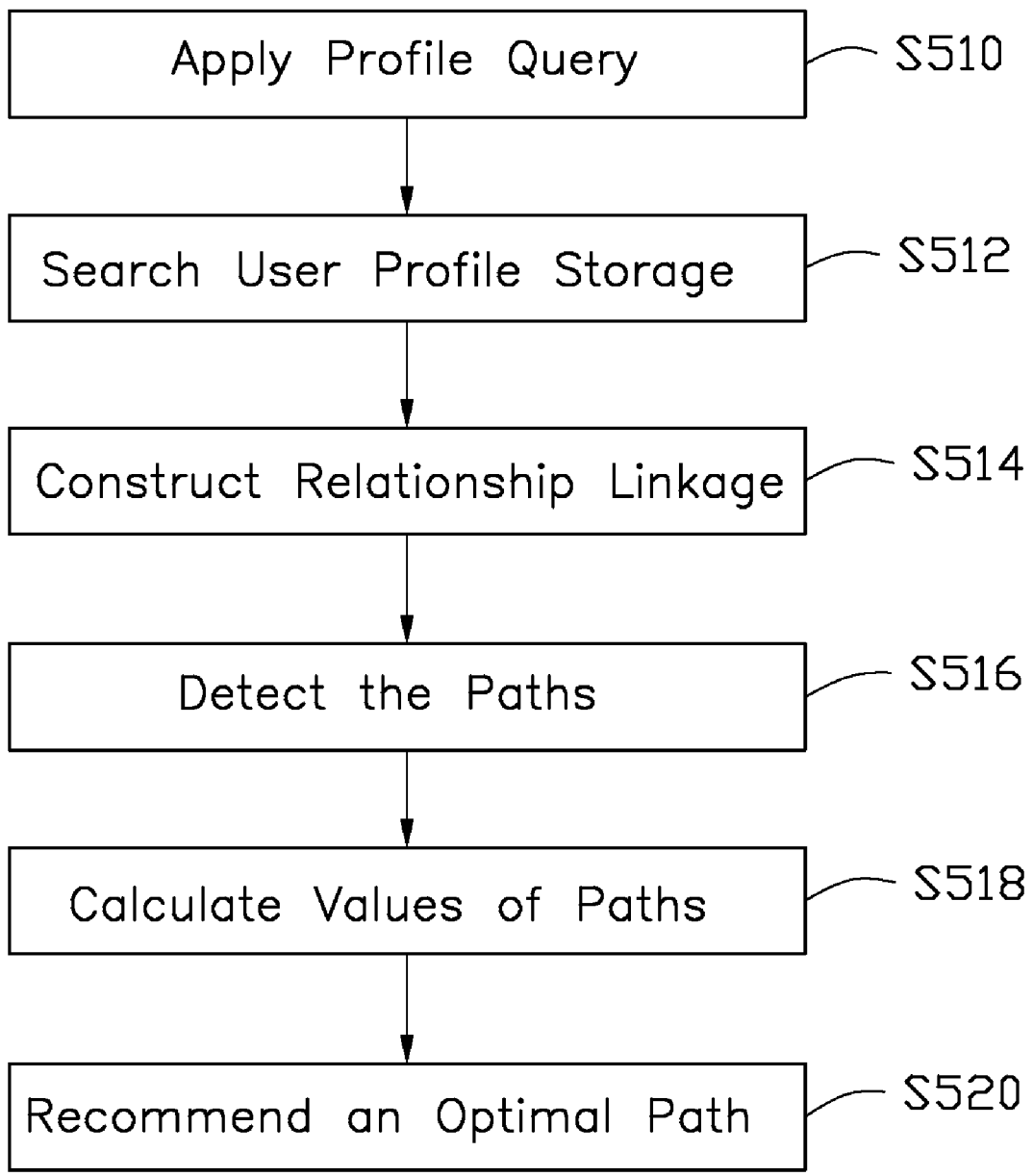
FIG. 4 is a flow chart illustrating a process for a member searching and analyzing in one embodiment.

Referring to FIG. 4, in one embodiment, a method of social network for member searching and analyzing include the following steps:

In block S510, the search engine 260 receives an application for profile query from a query user.

In block S512, a target member may be received by searching the user profile storage 240.

In block S514, the linkage construction engine 280 constructs a relationship linkage including a query user and the target member.

In block S516, at least two paths from the query user to the target member is located.

In block S518, at least two path values of at least two paths are calculated by multiplying passed relationship scores in the path from the query user to the target member.

In block S520, an optimal path to target member according to relationship linkage is extracted and recommended. The optimal path according to the optimum path value is selected.

While the present disclosure has been illustrated by the description of the embodiments thereof, and while the embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A member searching and analyzing method of a social network, comprising:
    obtaining a target member by searching a user profile storage based on a profile query from a query user;
    constructing a relationship linkage from the query user to the target member, wherein the constructing the relationship linkage comprises:
        obtaining a plurality of node members between the query user and the target member; and
        calculating a plurality of relationship scores indicating a relationship phase between each and every two of the query user, the target member and the plurality of node members;
    extracting an optimal path from at least two paths from the query user to the target member according to the relationship linkage; and
    recommending the optimal path to the query user.

2. The member searching and analyzing method of the claim 1, wherein extracting an optimal path to the target member according to the relationship linkage further comprises:
    detecting the at least two paths from the query user to the target member;
    calculating a path value of each of the at least two paths according to the plurality of relationship scores in each of the at least two paths; and
    selecting the optimal path according to an optimum path value.

3. The member searching and analyzing method of the claim 1, wherein each relationship score is defined in range from 0 to 1, and each of the at least two path values is calculated by multiplying passed relationship scores in each of the at least two paths.

4. The member searching and analyzing method of the claim 1, wherein each relationship score is associated with degree of interaction between every two of the query user, the target member, and the node members.

5. The member searching and analyzing method of the claim 4, wherein the degree of interaction comprises a time interval from the latest interaction to present, frequency of the interaction and the strength value of the interaction, and the strength value comprises a duration of the interaction.

6. The member searching and analyzing method of the claim 5, wherein the strength value of the interaction comprises duration of the interaction.

7. The member searching and analyzing method of the claim 5, wherein the degree of the interaction is in inverse proportion with the time interval from the latest interaction to present.

8. The member searching and analyzing method of the claim 5, wherein the degree of interaction is in direct proportion with frequency of the interaction and the strength value of the interaction.

9. A social network searching system, comprising:
    a user profile storage storing user profiles;
    a profile search engine, configured for obtaining a target member by searching the user profile storage based on a profile query from a query user, obtaining a plurality of node members between the query user and the target member, and calculating a plurality of relationship scores indicating a relationship phase between each and every two of the query user, the target member and the plurality of node members; and
    a linkage construction engine configured for constructing a relationship linkage and extracting an optimal path from at least two paths from the query user to the target member according to the relationship linkage.

10. The social network searching system of the claim 9, wherein the linkage construction engine is configured for calculating at least two path values of the at least two paths according to the plurality of relationship scores in the at least two paths, and selecting the optimal path according to the at least two path values.

11. The social network searching system of the claim 9, wherein each relationship score is defined in range from 0 to 1, and each of the at least two path values is calculated by multiplying passed relationship scores in each of the at least two paths.

12. The social network searching system of the claim 9, wherein each relationship score is associated with degree of interaction between every two of the query user, the target member, and the node members.

13. The social network searching system of the claim 12, wherein the degree of interaction comprises time interval from the latest interaction to present, frequency of the interaction and a strength value of the interaction, and the strength value comprises duration of the interaction.

14. The social network searching system of the claim 12, wherein the strength value of the interaction comprises duration of the interaction.

15. The social network searching system of the claim 12, wherein the degree of the interaction is in inverse proportion with time interval from the latest interaction to present.

16. The social network searching system of the claim 12, wherein the degree of interaction is in direct proportion with frequency of the interaction and the strength value of the interaction.

17. A member searching and analyzing method of social network, comprising:
    providing a user profile storage storing user profiles; a profile search engine, configured for obtaining a target member by searching the user profile storage based on a profile query from a query user, obtaining a plurality of node members between the query user and the target member, and calculating a plurality of relationship scores indicating a relationship phase between each and every two of the query user, the target member and the plurality of node members; and a linkage construction engine, configured for constructing a relationship linkage and extracting an optimal path from the query user to the target member according to the relationship linkage;
    obtaining a target member by searching a user profile storage based on the profile query from the query user;
    constructing the relationship linkage from the query user to the target member;
    extracting the optimal path from the query user to the target member according to the relationship linkage; and
    recommending the optimal path to the query user.

18. The member searching and analyzing method of the claim 17, wherein each relationship score is defined in range from 0 to 1, and each of the at least two path values is calculated by multiplying passed relationship scores in each of the at least two paths.

\* \* \* \* \*